United States Patent
Konno et al.

[11] Patent Number: 6,157,781
[45] Date of Patent: *Dec. 5, 2000

[54] LENS BARREL, ACCESSORY AND CAMERA SYSTEM

[75] Inventors: Tatsuo Konno, Yokohama; Masayoshi Kiuchi, Isehara, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/862,658

[22] Filed: May 23, 1997

[30] Foreign Application Priority Data

May 30, 1996 [JP] Japan ................................ 8-136810

[51] Int. Cl.[7] ........................... G03B 11/00; H04N 5/225
[52] U.S. Cl. ......................... 396/71; 348/340; 348/342; 348/360; 359/892; 396/544
[58] Field of Search ...................................... 396/544, 545, 396/529, 530, 531, 532, 533, 71; 348/340, 342, 360; 359/889, 892

[56] References Cited

U.S. PATENT DOCUMENTS

| | | | |
|---|---|---|---|
| 4,063,263 | 12/1977 | Krewalk, Sr. | 396/494 |
| 4,527,189 | 7/1985 | Ooi et al. | 358/29 |
| 5,568,197 | 10/1996 | Hamano | 348/342 |
| 5,581,301 | 12/1996 | Ninomiya | 348/342 |
| 5,589,882 | 12/1996 | Shiraishi et al. | 348/340 |
| 5,666,569 | 9/1997 | Fullam et al. | 396/101 |

FOREIGN PATENT DOCUMENTS

| | | |
|---|---|---|
| 63-239429 | 10/1988 | Japan . |
| 4158330 | 6/1992 | Japan . |
| 4275534 | 10/1992 | Japan . |
| 4355571 | 12/1992 | Japan . |
| 6167676 | 6/1994 | Japan . |
| 8262564 | 10/1996 | Japan . |

*Primary Examiner*—W. B. Perkey
*Attorney, Agent, or Firm*—Robin, Blecker & Daley

[57] ABSTRACT

A lens barrel which is detachably mountable on a camera body comprises a lens system and a low-pass filter, wherein the low-pass filter is detachably mountable with respect to an optical path of the lens system. An accessory which is provided between a camera body and a lens barrel and which is detachably mountable on the camera body and the lens barrel, comprises a lens and a low-pass filter. A camera system comprises a camera body and a lens barrel which is detachably mountable on the camera body, wherein the lens barrel has a low-pass filter which is detachably mountable with respect to an optical path of a lens system.

17 Claims, 6 Drawing Sheets

LENS BARREL, ACCESSORY AND CAMERA SYSTEM

BACKGROUND OF THE INVENTION

1. Field of the Invention

This invention relates to a solid-state image-sensor camera system, for example, of a single-lens reflex type, capable of recording information by means of a solid-state image sensor and capable of permitting interchanging of lenses, to a detachably-mountable lens barrel adapted for use in the camera system, and to an accessory adapted to be inserted in between the lens barrel and a camera body.

2. Description of Related Art

In cameras of the so-called single-lens reflex type (hereinafter referred to as single-lens reflex cameras), which are arranged to have one and the same photo-taking lens used in common by a viewfinder optical system for observing an object to be photographed and by an image forming system for photographing the object, there have been proposed various cameras of such a type that a solid-state image sensor is used as an image recording part in place of the conventional silver-halide film. Hereinafter, the single-lens reflex camera of the kind using a solid-state image sensor will be called a solid-state image-sensor camera.

If the interchangeable lenses and accessories such as external flash devices, etc., which have been adapted for the conventional single-lens reflex cameras using silver-halide film are not usable for the solid-state image-sensor cameras, it is a great disadvantage not only for single-lens reflex camera users but also for camera providers.

In view of this problem, efforts have been made to provide solid-state image-sensor cameras which retain interchangeability with the system of the conventional single-lens reflex cameras. For this purpose, it has been considered to be most rational to arrange a solid-state image-sensor camera to have a solid-state image sensor disposed in a focusing image forming part equivalent to a silver-halide film on the basis of the arrangement of the conventional single-lens reflex camera using the silver-halide film. On this viewpoint, various solid-state image-sensor cameras have been developed.

In such a solid-state image-sensor camera using a solid-state image sensor, a CCD or the like is employed as the image sensor in general. In that case, an optical filter is generally attached for correcting spectral sensitivity characteristics, because the characteristics of the CCD or the like in use necessitate such correction.

The optical filter generally includes an infrared cutting filter which is disposed immediately before the solid-state image sensor for the purpose of cutting off an infrared component.

Further, it is necessary to include a low-pass filter for avoiding undesirable phenomena, such as moire fringes caused by the relation between the number of pixels of the solid-state image sensor and the spatial frequency of an object, and a spurious color in the case of a color solid-state image sensor.

Generally, the optical filter of this kind is disposed immediately before the image sensor.

In the case of a solid-state image-sensor camera using a solid-state image sensor of a higher degree of resolution than a solid-state image sensor used for a video camera, a longer period of time is necessary for a process of transferring an image signal recorded on the solid-state image sensor to a storage device. Therefore, a light flux bearing an object image newly falling on the image sensor must be blocked during the process of transferring the image signal. For this purpose, the solid-state image-sensor camera must be provided with a mechanical focal plane shutter which is similar to the focal plane shutter of a camera using silver-halide film.

In the solid-state image-sensor camera based on a silver-halide-film-using single-lens reflex camera, the focal plane shutter is naturally disposed immediately before and near to a focusing image forming plane which corresponds to the position of a silver-halide film. Further, a main reflection mirror (main mirror) arranged to guide an object image light flux to a viewfinder optical system for viewing and confirming the object image by the photographer and an auxiliary reflection mirror (sub-mirror) arranged to guide a part of the object image light flux to an automatic focusing optical system are arranged to be retracted by a mirror driving device away from the path of a photo-taking light flux leading from a photo-taking lens to the solid-state image sensor when an exposure is made. However, since the mirror driving device and other associated parts are disposed immediately before the focal plane shutter, it has been difficult to secure a space for arranging the above-stated optical filter members such as the low-pass filter immediately before the solid-state image sensor.

BRIEF SUMMARY OF THE INVENTION

This invention is directed to the solution of the above-stated problem. It is, therefore, an object of the invention to provide an improved lens barrel, an improved accessory and an improved camera system which are arranged to solve the above-stated problem.

In accordance with an aspect of the invention, there is provided a lens barrel which is detachably mountable on a camera body, which comprises a lens system and a low-pass filter, wherein the low-pass filter is detachably mountable with respect to an optical path of the lens system.

In accordance with another aspect of the invention, there is provided an accessory which is provided between a camera body and a lens barrel and which is detachably mountable on the camera body and the lens barrel, which comprises a lens and a low-pass filter.

In accordance with a further aspect of the invention, there is provided an accessory which is provided between a camera body and a lens barrel and which is detachably mountable on the camera body and the lens barrel, which comprises a lens and an optical filter.

In accordance with a still further aspect of the invention, there is provided a camera system which comprises a camera body and a lens barrel which is detachably mountable on the camera body, wherein the lens barrel has a low-pass filter which is detachably mountable with respect to an optical path of a lens system.

The above and other objects and features of this invention will become apparent from the following detailed description of embodiments thereof taken in connection with the accompanying drawings.

DETAILED DESCRIPTION OF THE INVENTION

Hereinafter, preferred embodiments of this invention will be described in detail with reference to the drawings.

Figure 1:
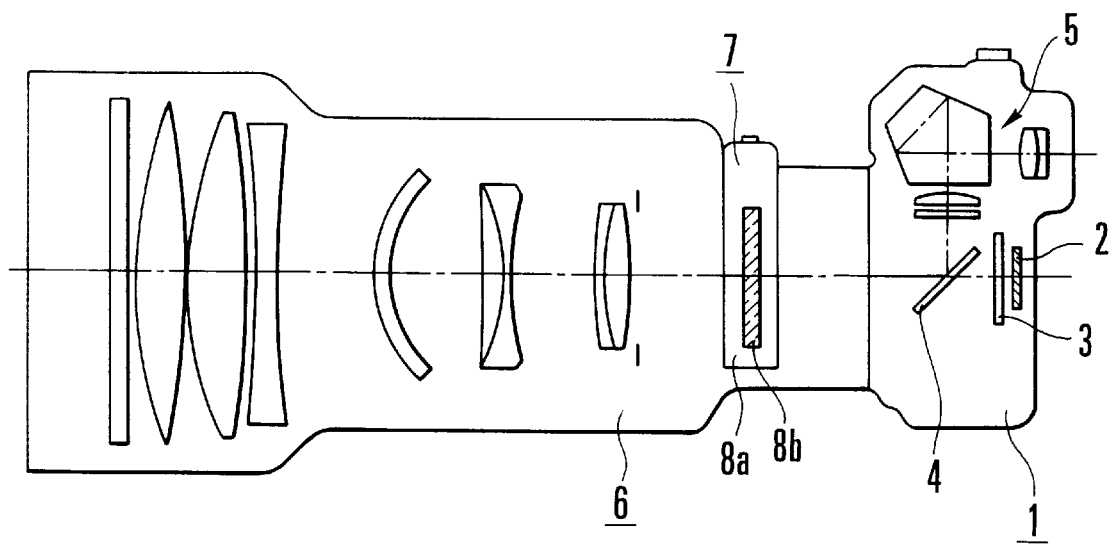
FIG. 1 is a sectional view taken across the center of a camera system to which the invention is applied as a first embodiment thereof.
Figure 2:
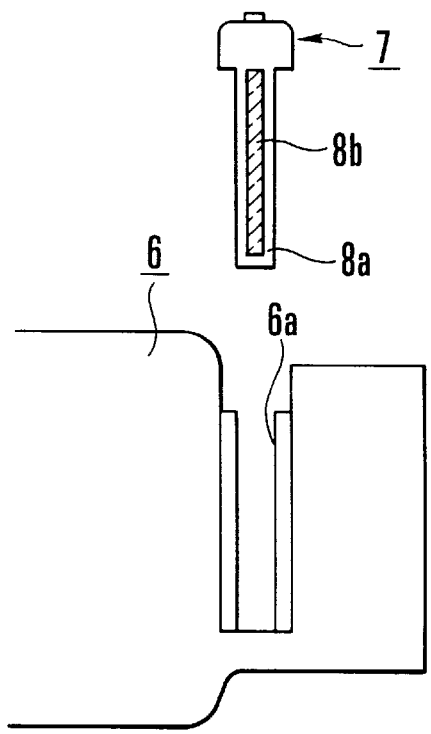
FIG. 2 is a partial sectional view showing essential parts around an opening part at which a filter unit shown in FIG. 1 is to be attached to a photo-taking interchangeable lens.
Figure 3:
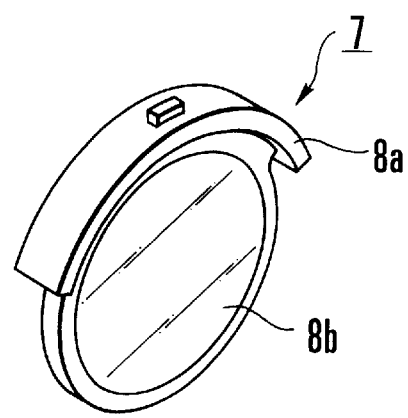
FIG. 3 is a perspective view showing the appearance of the filter unit shown in FIG. 2.

FIGS. 1, 2 and 3 relate to a solid-state image-sensor camera system to which the invention is applied as a first embodiment thereof. FIG. 1 is a sectional view taken across the center of the solid-state image-sensor camera system. FIG. 2 is a sectional view showing the essential parts of FIG. 1. FIG. 3 is a perspective view showing the appearance of a filter unit.

These illustrations include a camera body 1, an image sensor (CCD) 2, a focal plane shutter 3, a quick-return mirror 4 which is arranged to be swingable into two different states, i.e., a state in which it enters into an object light flux, as shown in FIG. 1, to guide the object light flux to a viewfinder optical system 5 and another state in which it stays outside of the light flux path, and a photo-taking interchangeable lens barrel 6. In the neighborhood of an end part of the photo-taking interchangeable lens barrel 6 in the rear of an optical axis thereof, there is formed an opening part 6a for enabling a drop-in type filter unit 7 serving as an optical filter member to be detachably mountable on (insertable into and removable from) the lens barrel 6. The filter unit 7 is composed of a frame body 8a and a filter 8b which is mounted on the frame body 8a in an interchangeable manner. In the case of the first embodiment, the filter 8b is a low-pass filter made of a diffraction grating or a double refracting crystal. The viewfinder optical system 5 includes a focusing screen, a condenser lens, a pentagonal prism and an eyepiece.

In a case where the effect attainable by the low-pass filter is not necessary, the low-pass filter 8b may be removed. In such a case, an ordinary, regular filter may be used in place of the low-pass filter 8b. It is also possible to replace the low-pass filter 8b with a filter of some other suitable kind.

Figure 4:
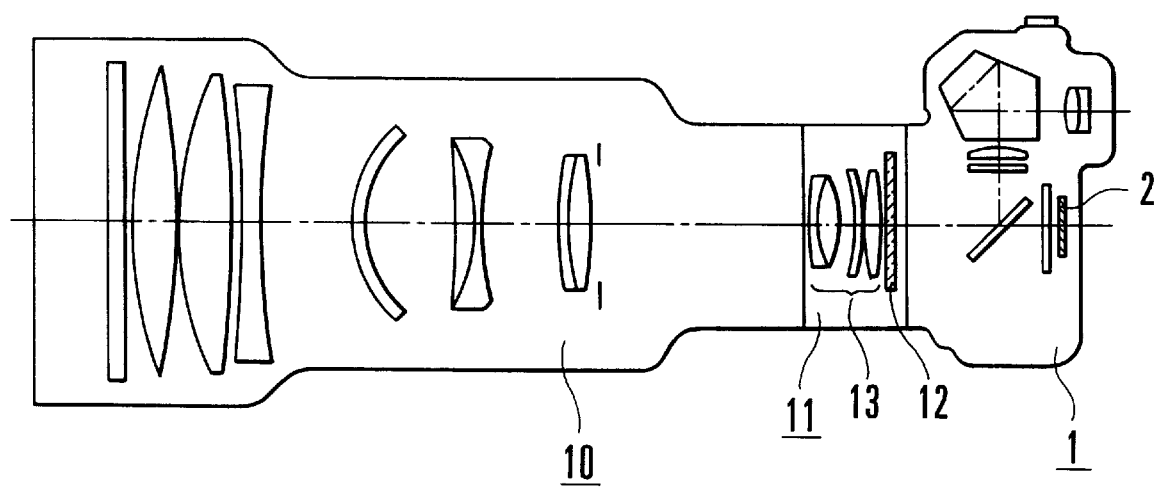
FIG. 4 is a sectional view taken across the center of a camera system to which the invention is applied as a second embodiment thereof.

FIG. 4 is a sectional view taken across the center of a solid-state image-sensor camera system according to a second embodiment of the invention. In FIG. 4, members that are the same as those shown in FIG. 1 are indicated by the same reference numerals and the details of them are omitted from the description.

Referring to FIG. 4, reference numeral 10 denotes a photo-taking interchangeable lens barrel. Reference numeral 11 denotes an extender (an adapter of unit magnification) which is disposed between the photo-taking interchangeable lens barrel 10 and the camera body 1 as an optical accessory. The extender 11 incorporates therein a low-pass filter 12 and a lens 13 and is mounted by a known coupling method on a mount which is arranged to detachably connect the photo-taking interchangeable lens barrel 10 and the camera body 1 with each other.

With the extender 11 inserted in between the camera body 1 and the photo-taking interchangeable lens barrel 10, the low-pass filter 12 can be provided for the solid-state image sensor 2 of the camera body 1.

Further, since the extender 11 is arranged to be detachably mountable on the camera body 1 in the second embodiment, a photographing operation can be carried out by removing the extender 11, in the same manner as in the case of the first embodiment, in a case where-the effect attainable by the low-pass filter is not required.

Figure 5:
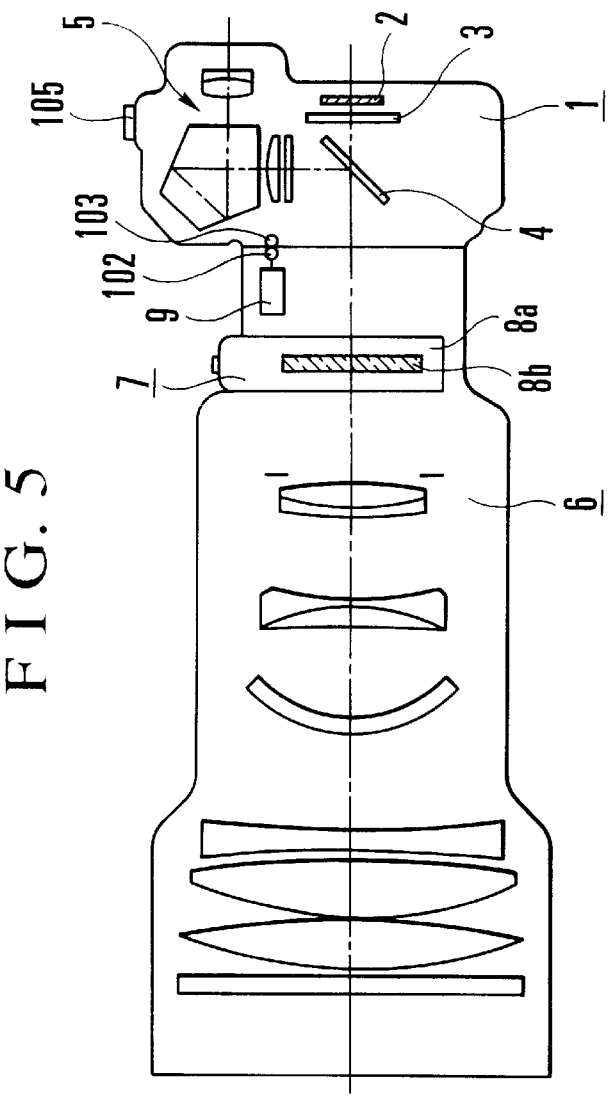
FIG. 5 is a sectional view taken across the center of a camera system to which the invention is applied as a third embodiment thereof.
Figure 6:
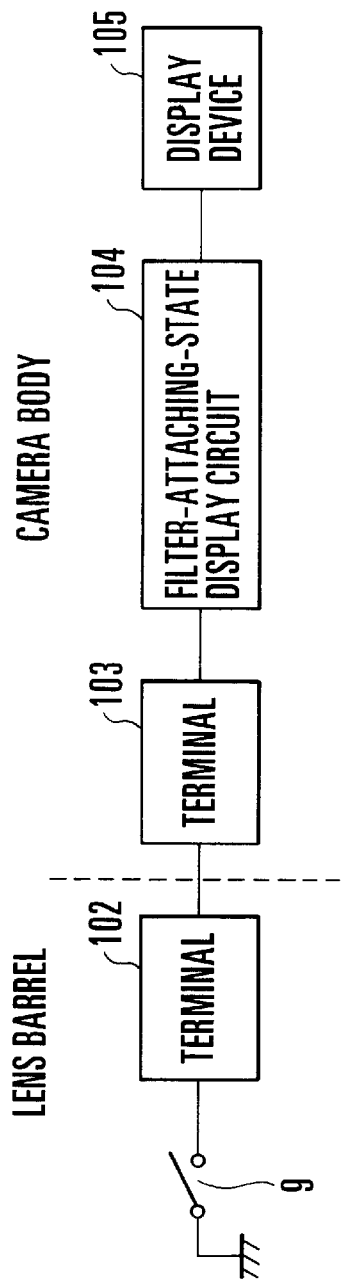
FIG. 6 is a block diagram showing the circuit arrangement of the third embodiment.

FIGS. 5 and 6 show a third embodiment of the invention. In the third embodiment, a low-pass filter detecting means 9 is added to the first embodiment shown in FIG. 1. FIG. 6 shows the circuit arrangement associated with the low-pass filter detecting means 9.

In FIG. 6, reference numeral 9 denotes a detection switch arranged to detect the low-pass filter 8b of the filter unit 7. When the filter unit 7 is attached to the photo-taking interchangeable lens barrel 6 in the state of having the low-pass filter 8b mounted on the frame body 8a, the detection switch 9 is caused to turn on, for example, by a switch operating member provided only on the low-pass filter 8b. The detection switch 9 is arranged to turn off when a filter other than the low-pass filter 8b is attached.

An on- or off-signal of the detection switch 9 is sent, through a terminal 102 which is provided on the photo-taking interchangeable lens barrel 6 for communication with the camera body 1 and a communication terminal 103 which is arranged on the camera body 1 to be connected to the terminal 102, to a filter-attaching-state display circuit 104 disposed within the camera body 1.

Figure 7:
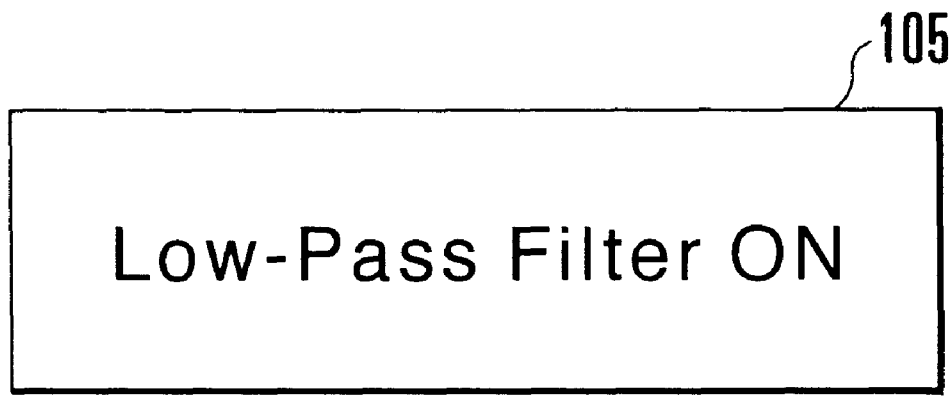
FIG. 7 shows a display provided by a display device in the third to sixth embodiments of the invention.

When the detection switch 9 for detecting the low-pass filter 8b turns on, the filter-attaching-state display circuit 104 causes a display device 105 which is provided either on the outside of the camera body 1 or within a viewfinder to provide a display indicating that the low-pass filter 8b is attached, as shown in FIG. 7.

Figure 8:
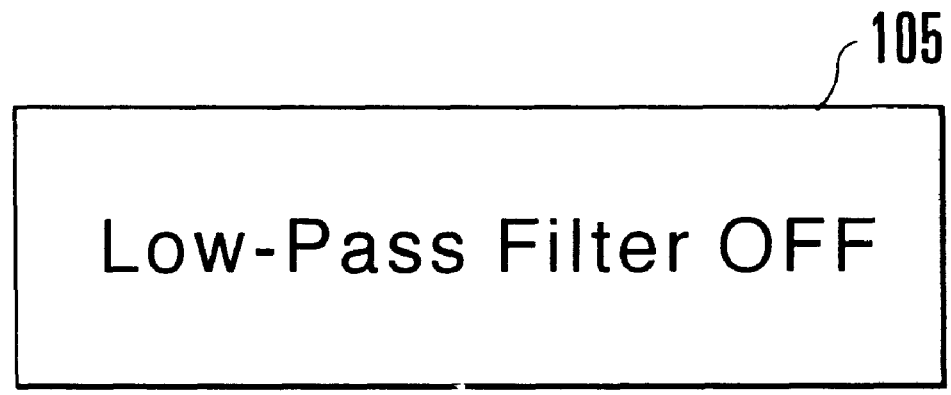
FIG. 8 shows another display provided by a display device in the third to sixth embodiments of the invention.

Further, in a case where a filter other than the low-pass filter 8b is attached, the detection switch 9 turns off to cause the display device 105 to provide a display indicating that the low-pass filter 8b is not attached, as shown in FIG. 8.

Figure 9:
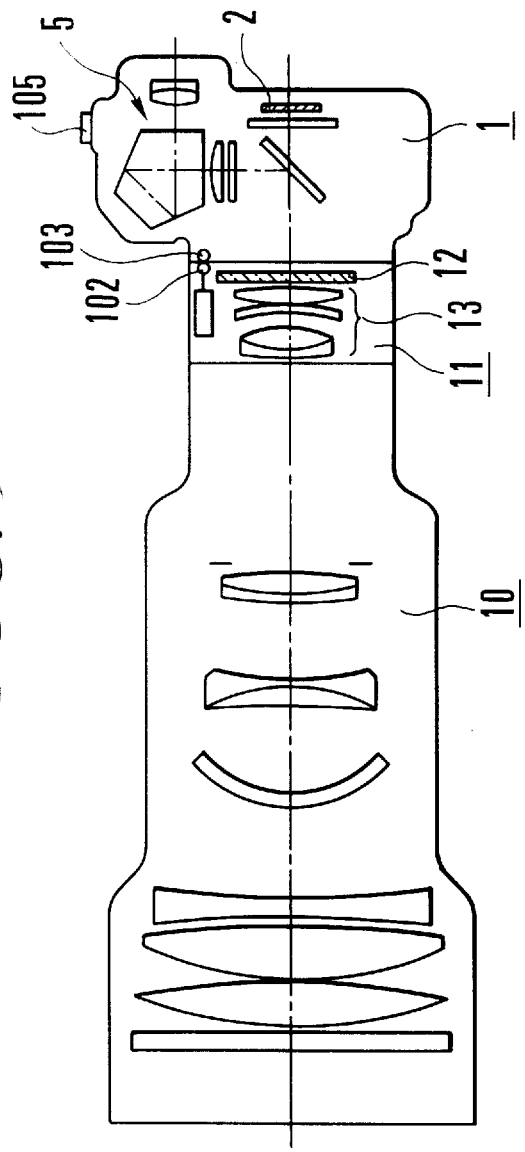
FIG. 9 is a sectional view taken across the center of a camera system to which the invention is applied as the fourth embodiment thereof.
Figure 10:
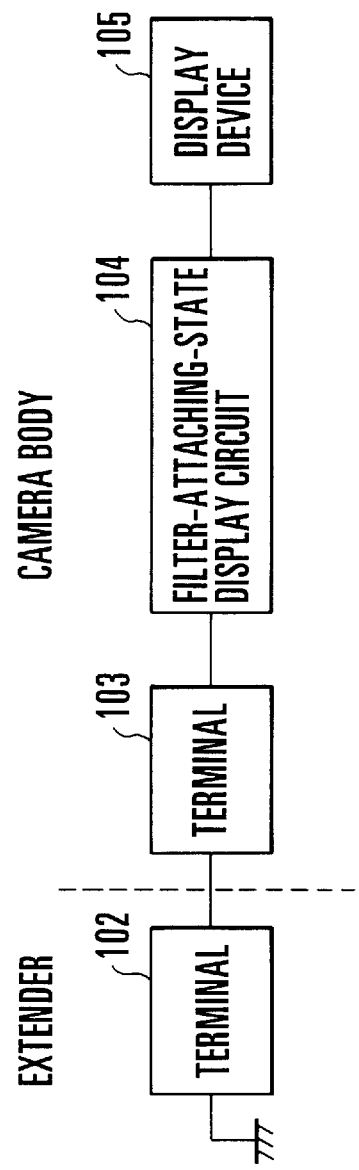
FIG. 10 is a block diagram showing the circuit arrangement of the fourth embodiment.

FIG. 9 s hows a fourth embodiment of the invention. In the case of the fourth embodiment, a display means for displaying use of the low-pass filter is added to the second embodiment shown in FIG. 4. FIG. 10 shows the circuit arrangement associated with the low-pass filter display means. In the fourth embodiment, the circuit arrangement on the side of the camera body is the same as what is shown in FIG. 6.

Referring to FIGS. 9 and 10, the extender 11 incorporating the low-pass filter 12 therein is provided with a connection terminal 102. The connection terminal 102 is connected to the ground of the extender 11. A low-pass filter attaching signal which is the ground signal of the extender 11 is supplied to the filter-attaching-state display circuit 104 of the camera body 1 through the terminal 102 and the terminal 103 which is disposed on the camera body 1.

When the extender 11 incorporating the low-pass filter 12 therein is attached to the camera body 1, the filter-attaching-state display circuit 104 causes the display device 105 to provide a display indicating that the low-pass filter is attached, as shown in FIG. 7.

Any extender other than the low-pass filter incorporating extender 11, or a lens barrel itself, is not provided with the terminal 102. Therefore, when such an extender or a lens barrel is mounted on the camera body 1, the signal level of the terminal 103 becomes high to cause the display device 105 to provide a display indicating that the low-pass filter is not attached, as shown in FIG. 8.

Figure 11:
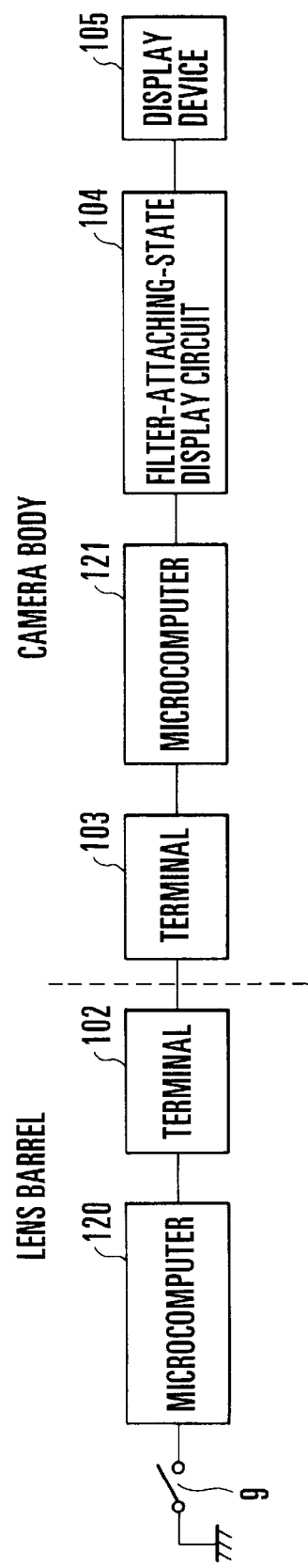
FIG. 11 is a block diagram showing the circuit arrangement of the fifth embodiment of the invention.

FIG. 11 is a block diagram showing a fifth embodiment of the invention. The fifth embodiment is a modification of the third embodiment which is arranged to transmit information on the low-pass filter attaching state by communication between the camera body and the lens barrel as shown in FIG. 6. The fifth embodiment differs from the arrangement of FIG. 6 in that a microcomputer 120 is provided on the side of the photo-taking interchangeable lens barrel.

Referring to FIG. 11, the fifth embodiment has a low-pass filter detection switch 9. When the low-pass filter 8b is attached to the frame body 8a of the filter unit 7, the low-pass filter detection switch 9 turns on. The switch 9 turns off when a filter other than the low-pass filter 8b is attached.

A signal from the low-pass filter detection switch 9 is supplied to and processed by the microcomputer 120 disposed within the photo-taking interchangeable lens barrel 6. Then, at a communication terminal of the microcomputer 120, a bit which indicates attaching of the low-pass filter becomes "1". A signal of the bit "1" thus obtained is sent through the terminals 102 of the lens barrel 6 and the terminal 103 of the camera body 1 to another microcomputer 121 disposed within the camera body 1.

The microcomputer 121 decodes the input signal of the bit "1" which indicates that the low-pass filter is attached. After that, the microcomputer 121 sends at a high level a signal indicating that the low-pass filter is attached, to the filter-attaching-state display circuit 104. When the level of the signal indicating that the low-pass filter is attached becomes high, the filter-attaching-state display circuit 104 causes the display device 105 to provide a display indicating that the low-pass filter is attached, as shown in FIG. 7.

When a filter other than the low-pass filter is attached, the detection switch 9 turns off. The off signal thus obtained is sent to the microcomputer 120 of the photo-taking interchangeable lens barrel 6 to be processed there. Then, at the communication terminal of the microcomputer 120, a bit for indicating that a filter other than the low-pass filter is attached becomes "0". A signal of the bit "0" thus obtained is sent, through the terminal 102 and also the terminal 103 of the camera body 1, to the microcomputer 121 of the camera body 1.

The microcomputer 121 then decodes the signal of the bit "0" which indicates that a filter other than the low-pass filter is attached. After the decoding, a low level signal indicating that a filter other than the low-pass filter is attached is sent from the microcomputer 121 to the filter-attaching-state display circuit 104.

Upon receipt of the low level signal indicating that a filter other than the low-pass filter is attached, the filter-attaching-state display circuit 104 causes the display device 105 to provide a display indicating that the low-pass filter is not attached, as shown in FIG. 8.

The fifth embodiment is thus arranged to display the filter attaching state in the above-stated manner to accurately inform the operator that the low-pass filter is attached to the camera system.

Figure 12:
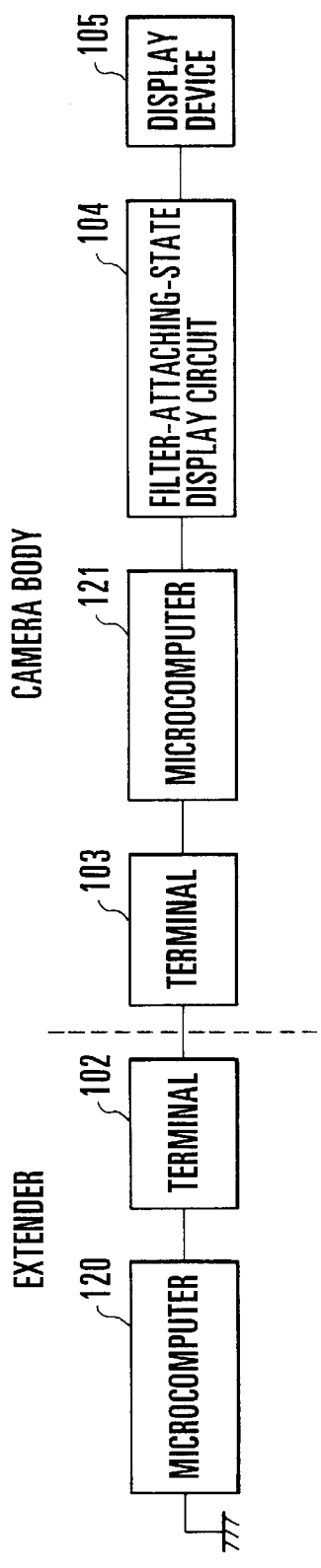
FIG. 12 is a block diagram showing the circuit arrangement of the sixth embodiment of the invention.

FIG. 12 is a block diagram showing a sixth embodiment of the invention. The sixth embodiment is a modification of the fourth embodiment shown in FIG. 10. The sixth embodiment differs from the fourth embodiment in that a microcomputer 120 is arranged on the side of the extender 11. The sixth embodiment fundamentally operates in the same manner as the fifth embodiment in which the microcomputer 120 is disposed within the photo-taking interchangeable lens barrel 6. The microcomputer 120 is arranged to have a signal of a ground level inputted thereto and to send a signal of a bit "1" which indicates that the extender has a low-pass filter, to a terminal 102. Then, processes are carried out in the same manner as those of the fifth embodiment through a terminal 103 which is arranged on the side of the camera body 1 to be in electrical connection with the terminal 102.

Incidentally, while the filter 8b or 12 is a low-pass filter in each of the embodiments described above, the low-pass filter may be replaced with an infrared cutting filter.

What is claimed is:

1. A lens barrel arranged to be detachably mountable on a camera body having a solid state image sensor, comprising:
   a lens system; and
   a low-pass filter, said low-pass filter being detachably attachable with respect to an optical path of said lens system and said low-pass filter being detachable from said lens barrel while said lens barrel is attachable to said camera body.

2. A lens barrel according to claim 1, wherein said low-pass filter is arranged to be mounted on an image plane side of said lens system.

3. A lens barrel according to claim 2, further comprising a detector which detects whether or not said low-pass filter is provided in said optical path.

4. A lens barrel according to claim 1, further comprising a detector which detects whether or not said low-pass filter is provided in said optical path.

5. A lens barrel according to claim 1, wherein said camera body is a single-lens reflex camera.

6. An accessory arranged to be provided between a camera body and a lens barrel and to be detachably mountable on said camera body having a solid-state image sensor and said lens barrel, comprising:
   a lens; and
   a low-pass filter, said low-pass filter being detachable from said lens barrel while said lens barrel is attachable to said camera body.

7. An accessory according to claim 6, further comprising means for informing said camera body that said accessory is mounted on said camera body.

8. An accessory according to claim 6, wherein said camera body is a single-lens reflex camera.

9. A camera system comprising:
   a camera body having a solid-state image sensor; and
   a lens barrel arranged to be detachably mountable on said camera body, said lens barrel having a low-pass filter arranged to be detachably mountable with respect to an optical path of a lens system, said low-pass filter being detachable from said lens barrel while said lens barrel is attachable to said camera body.

10. A camera system according to claim 9, wherein said low-pass filter is arranged to be mounted on an image plane side of said lens system.

11. A camera system according to claim 10, further comprising:
   a detector which detects whether or not said low-pass filter is provided in said optical path; and
   a display device which displays whether or not said low-pass filter is provided in said optical path, according to an output of said detector.

12. A camera system according to claim 9, further comprising a detector which detects whether or not said low-pass filter is provided in said optical path.

13. A camera system according to claim 12, further comprising a display device which displays whether or not said low-pass filter is provided in said optical path, according to an output of said detector.

14. A system according to claim 9, wherein said camera body is a single-lens reflex camera.

15. A lens barrel arranged to be detachably mountable on a camera body having a solid-state image sensor, comprising:
   a lens system; and
   an infrared cut filter, said filter being detachably attachable with respect to an optical path of said lens system and said filter being detachable from said lens barrel while said lens barrel is attached to said camera body.

16. An accessory arranged to be provided between a camera body and a lens barrel and to be detachably mountable on said camera body having a solid state image sensor and said lens barrel, comprising:
   a lens; and
   an infrared cut filter, said filter being detachable from said lens barrel while said lens barrel is attached to said camera body.

17. A camera system comprising:
   a camera body having a solid-state image sensor; and
   a lens barrel arranged to be detachably mountable on said camera body, said lens barrel having an infrared cut filter arranged to be detachably mountable with respect to an optical path of a lens system, said infrared cut filter being detachable from said lens barrel while said lens barrel is attached to said camera body.

* * * * *